United States Patent
Ciesielka et al.

(10) Patent No.: US 7,124,627 B2
(45) Date of Patent: Oct. 24, 2006

(54) AIR FILTER RESTRICTION SENSOR ASSEMBLY

(75) Inventors: Sean V. Ciesielka, Belvidere, IL (US); James S. Zielinski, Schaumburg, IL (US); David R. Nowak, Chicago, IL (US)

(73) Assignee: Illinois Tool Works Inc, Glenview, IL (US)

( * ) Notice: Subject to any disclaimer, the term of this patent is extended or adjusted under 35 U.S.C. 154(b) by 11 days.

(21) Appl. No.: 11/130,676

(22) Filed: May 17, 2005

(65) Prior Publication Data

US 2006/0032298 A1 Feb. 16, 2006

Related U.S. Application Data

(60) Provisional application No. 60/600,981, filed on Aug. 12, 2004, provisional application No. 60/618,299, filed on Oct. 13, 2004.

(51) Int. Cl.
*G01M 19/00* (2006.01)
(52) U.S. Cl. ............ 73/118.2; 73/119 R; 73/118.1
(58) Field of Classification Search ........ 73/116–118.2
See application file for complete search history.

(56) References Cited

U.S. PATENT DOCUMENTS

| | | | | |
|---|---|---|---|---|
| 4,369,728 A | * | 1/1983 | Nelson | 116/276 |
| 4,445,456 A | * | 5/1984 | Nelson | 116/268 |
| 4,688,511 A | * | 8/1987 | Gerlach et al. | 116/268 |
| 5,401,922 A | | 3/1995 | Asta | |
| 5,774,056 A | * | 6/1998 | Berry et al. | 340/607 |
| 5,850,183 A | * | 12/1998 | Berry, III | 340/607 |
| 6,161,417 A | * | 12/2000 | Nepsund | 73/1.68 |
| 6,327,902 B1 | * | 12/2001 | Berry et al. | 73/119 R |

* cited by examiner

*Primary Examiner*—Edward Lefkowitz
*Assistant Examiner*—Jermaine Jenkins
(74) *Attorney, Agent, or Firm*—Paul F. Donovan; Mark W. Croll

(57) ABSTRACT

An air filter restriction sensor assembly for use on an engine, such as a small gas engine provides a simple on/off system with remote indicating to notify the operator of the air restriction. More specifically, the air restriction in the air intake line of the engine creates a vacuum which pulls on a plunger mechanism until the mechanism contacts a switch, such as a membrane switch, and activates the switch. The switch can be electrically connected to an indicator device, such as a light-emitting diode, which is readily visible to the operator to notify the operator of the air restriction.

20 Claims, 9 Drawing Sheets

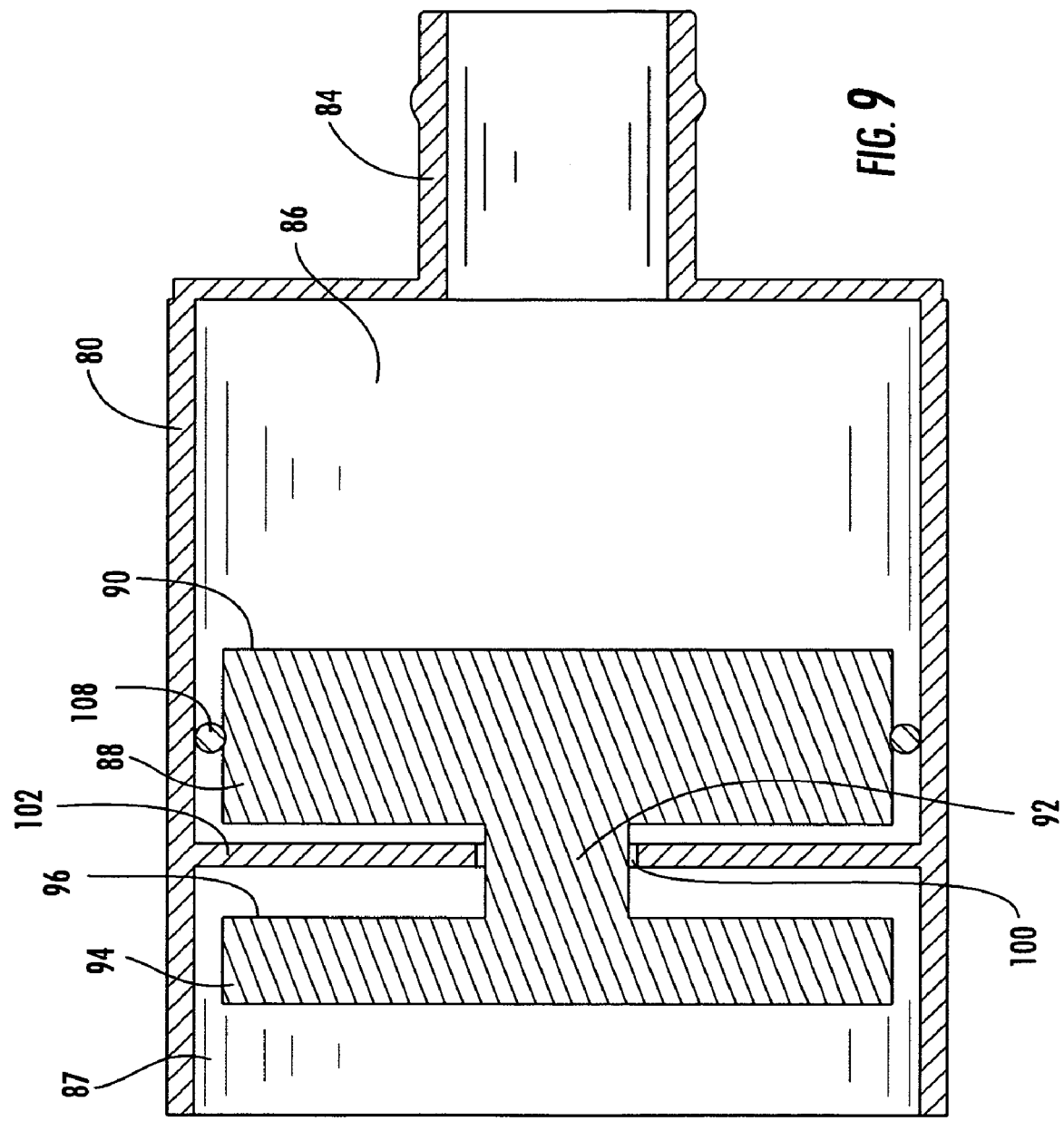

AIR FILTER RESTRICTION SENSOR ASSEMBLY

CROSS REFERENCE TO RELATED APPLICATION

This Non-Provisional Application claims benefit to U.S. Provisional Application Ser. No. 60/600,981 filed Aug. 12, 2004 and U.S. Provisional Application Ser. No. 60/618,299 filed Oct. 13, 2004.

FIELD OF THE INVENTION

The present invention relates generally to air filter restriction sensor assemblies, and more particularly to such assemblies for use in small gas engines.

BACKGROUND OF THE INVENTION

It is known that small gas engines are used on equipment and vehicles such as lawn mowers, lawn tractors, and the like. When used on lawn mowers, for example, the engines are exposed to the environment where they may be subject to debris, dirt, moisture, or other contaminants. To maintain the proper functioning of the gas engine, air filters are used to screen and filter the air that is taken in by the engine and more specifically the carburetor of the engine. In many applications, the air filter is concealed from view and therefore when dirt or debris is on the filter, thereby restricting the air flow, this condition is not readily apparent to the operator.

To overcome this problem, known engines sometimes include a sensor mechanism to detect if the dirt or debris on the air filter is restricting the air flow to the engine. As the air filter on the engine becomes dirty and the air flow becomes restricted, vacuum is increased in the air intake line of the engine downstream from the air filter. Conventionally, the vacuum created by the air restriction is detected by a spring-loaded sensor device, a micro-switch, or both, that show the operator the state of the air filter restriction. The springs or micro-switches, however, wear out over time, can give false readings from the engine vibration, or can be difficult to calibrate.

The present invention is directed at improving upon known air filter restriction sensor assemblies and in particular air filter restriction sensor assemblies for small gas engines.

SUMMARY OF THE INVENTION

The present invention is directed towards an air filter restriction sensor assembly for use on an engine, such as a small gas engine. With the invention, a simple on/off system is provided whereby the vacuum created in the air intake line created by the air restriction in the air filter pulls on a plunger mechanism until the mechanism contacts a membrane switch and activates the switch. The switch is adapted to send out an electrical signal that can be electrically connected to an indicator device, such as a light-emitting diode ("LED"), which is readily visible to the operator to notify the operator of the air restriction, a control module, such as an engine on/off switch, or any desired electrical operation.

An advantage of the teachings and principles of the invention is that there are no springs or switches that can wear out over time or give undesirable false readings from the engine vibration. An additional advantage is the membrane switch can be easily calibrated to activate under a desired contact pressure. Yet another advantage of the invention is the membrane switch is sealed so the fuel and any other contaminants coming from upstream to the carburetor will not adversely affect the performance of the invention. This invention also has the advantage of not requiring a manual reset like the prior art. Also, the invention has remote indicating in the form of an LED which permits the invention to be mounted directly to the air intake line and yet the operator will be able to readily monitor the condition of the air intake line.

Other features and advantages of the invention will become apparent to those skilled in the art upon review of the following detailed description, claims and drawings in which like numerals are used to designate like features.

BRIEF DESCRIPTION OF THE DRAWINGS

FIG. 9 is a cross-section view of yet another alternative embodiment of an air filter restriction sensor assembly.

Figure 1:
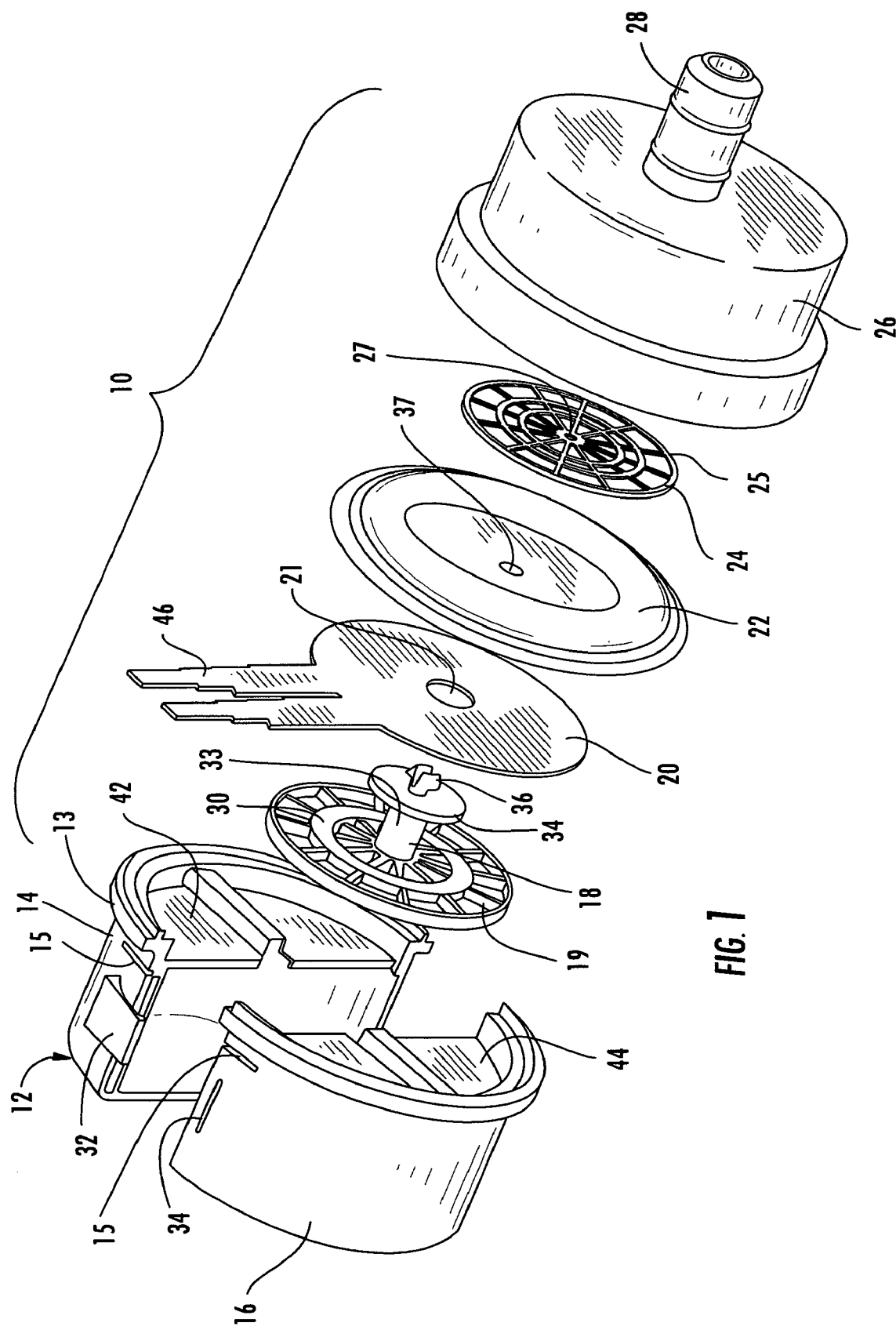
FIG. 1 is an exploded view of an exemplary air filter restriction sensor assembly of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

FIG. 1 depicts an exploded view of an exemplary embodiment of an air filter restriction sensor assembly of the invention. The air filter restriction sensor assembly 10 generally includes a top housing 12, a plunger 18, a switch 20, a diaphragm 22, a plunger disc 24, and a housing 26 that defines a nozzle end 28.

The top housing 12, in one embodiment, is formed by two housing halves 14 and 16. The housing 12 includes an integral hinge such as living hinge (not shown). The first housing half 14 includes a snap-arm 32 that may be used to snap-fit the first housing half 14 to a slot 34 formed in the second housing half 16. The housing halves 14, 16 are snap-fit together after the other components of the assembly 10 are properly mounted together and within the top housing 12. The assembled top housing 12 defines a rim 13 that extends around the periphery of the housing. As discussed below, the housing 26 will snap-fit to the rim 13 of the housing 12. The housing 12 further defines at least one slot 15 through which will extend electrical leads 46 of the switch 20. The slot 15 may be sized and shaped to match the shape of the lead 46 or any other type of lead used with the assembly.

Figure 2:
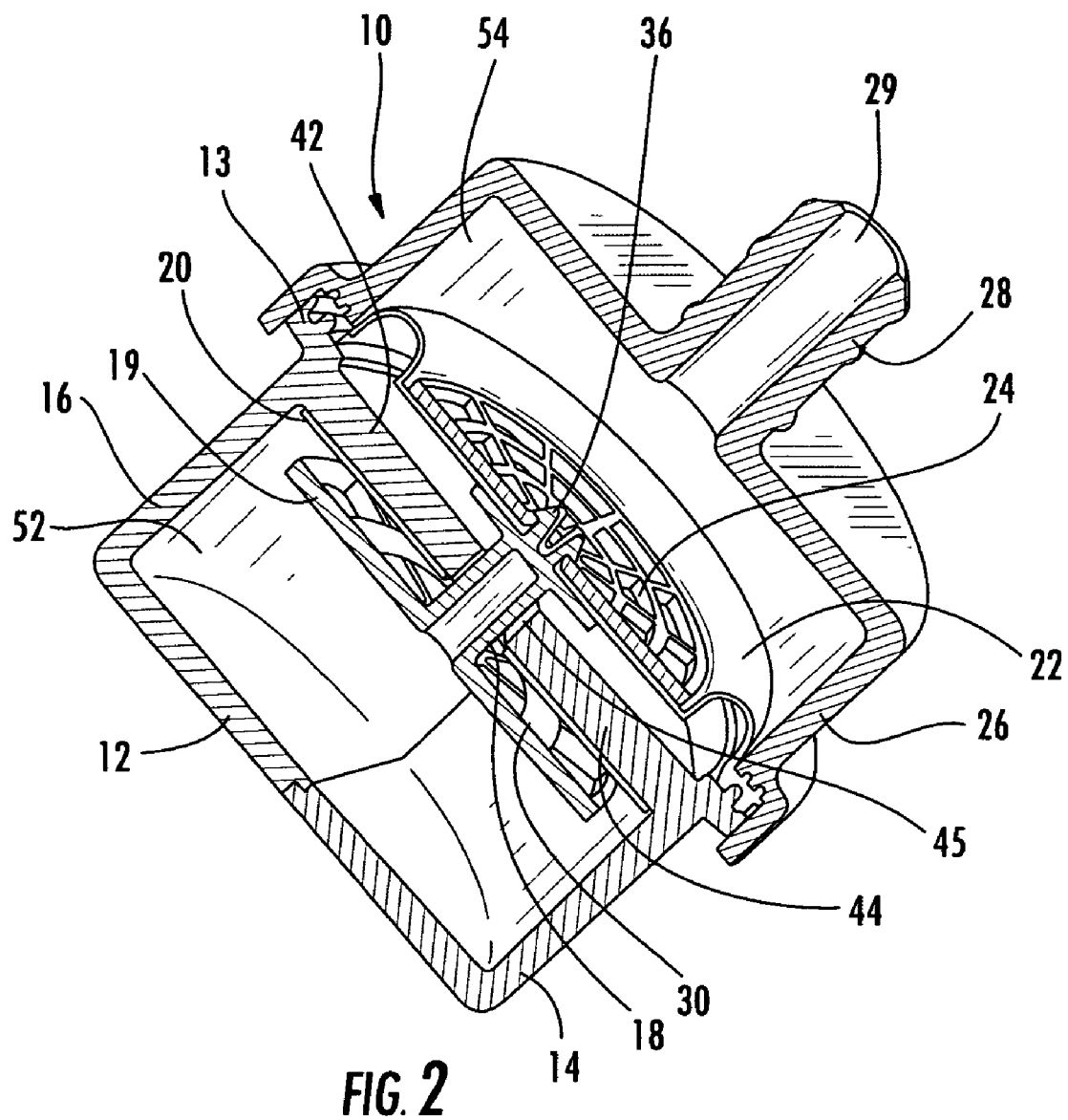
FIG. 2 is a cross-section view of the sensor assembly of FIG. 1.

The housing halves 14 and 16 further define interior walls 42 and 44, respectively. The walls 42 and 44 extend radially toward the center of the housing 12. When assembled, the walls 42 and 44 define a central opening 45 (FIG. 2) through which is mounted the plunger 18. The central opening 45 aligns and centers the plunger 18 relative to the housing 12 as the plunger 18 moves within the assembly, as discussed below. The walls 42 and 44 will also separate the assembly into chambers 52 and 54 (FIG. 2).

The plunger 18 or plunger member may be embodied in many forms and configurations and is meant to include any reciprocating moving part that facilitates the air restriction sensing of the invention. The plunger 18 or plunger member defines, in one aspect, a web-shaped body 19 on which is mounted an elastomer member 30. The body 19 is web-shaped to reduce the mass of this part so that engine vibration and other outside forces such as rocks or bumps encountered from a rough lawn, for example, have less adverse effect on the assembly. One skilled in the art will appreciate that other shapes and configurations of the body 19 are possible. The elastomer member 30 in the exemplary embodiment is over-molded onto the plunger 18 and more specifically onto the web-shaped body of the plunger 18. Other techniques for mounting, attaching, or connecting the elastomer member 30 are possible. The elastomer member 30 can be rubber or any suitable thermoplastic material. In use, as the plunger 18 moves within the assembly as a result of air restriction in the air filter, the plunger 18 will cause the elastomer member 30 to contact and activate the switch 20. Testing has shown that the switch 20 responds better to contact by a softer object, such as the elastomer member 30, as opposed to contact by a harder object, such as a solid plastic disc. However, both techniques and configurations for contacting the switch 20 may be used with the present invention.

The plunger 18 further defines a plunger support post 33 that is configured between the body 19 and a plunger head 34. As installed, the plunger support post 33 will pass through the opening 45 formed by the inner walls 42, 44, and through an opening 21 in the switch 20. The plunger 18 not only-defines the plunger head 34, but also defines opposing hinge fingers 36 that are formed onto the head 34. The hinge fingers 36 are flexible and serve to permit the plunger 18 to be snap-fit through an opening 37 in the diaphragm 22 and to a central opening 27 in the plunger disc 24. The hinge fingers 36 thus mount the diaphragm 22 and plunger disc 24 to the head 34.

The switch 20 defines a disc-shaped body and includes at least one lead 46 that, once assembled, will extend out of the housing 12 for electrical connection to a battery, an LED, or some other device or component. The switch 20 also defines the opening 21 through which will extend the support post 33 of the plunger 18. In an exemplary embodiment, the switch 20 may be a membrane switch, such as a switch described in U.S. Pat. No. 5,401,922. The switch 20 is activated when a predetermined force is exerted on the switch from the elastomer member 30, which is being pulled into contact with the switch 20 from the vacuum created in the chamber 54, as described below.

The diaphragm 22 defines a disc-shaped body having a crown-shaped periphery, more easily seen in FIG. 2. The crown-shaped periphery provides the disc-shaped body with a resiliency or springiness. The diaphragm 22 also defines the opening 37 that is centrally positioned on the diaphragm. The opening 37 permits the hinge fingers 36 to pass through the diaphragm and mount to the plunger disc 24. The diaphragm may be made of a rubber or elastomeric material. It should be understood that the diaphragm 22 may also be any plunger moving member that will cause movement of the plunger 18 under the conditions of a vacuum or restricted air flow.

Referring to FIG. 2, in use, and upon the creation of a vacuum in the chamber 54, the diaphragm 22 is adapted to move the plunger 18 and accompanying elastomer member 30 into contact with the switch 20. The diaphragm 22 is positioned between the top housing 12 and the housing 26 to provide an air tight seal in the chamber 54 and to permit a vacuum to form in the chamber 54 in the event of air restriction in the air intake line. The chamber 52, where the switch 20, web-shaped body 19 of the plunger, and elastomer member 30 are positioned, is not sealed and therefore will be open to the atmosphere. With this configuration, a vacuum will not form in chamber 52, thereby permitting the plunger 18 and more specifically the web-shaped body 19 containing the elastomer member 30 to move toward or away from the switch 20. In a small engine application, for example, where the nozzle end 28 of the assembly 10 is connected to the air intake line, if the air filter becomes plugged or obstructed, a vacuum will form in the chamber 54 such that the diaphragm 22 pulls the plunger 18 and accompanying elastomer member 30 into contact with the switch 20, thereby activating the switch 20. The switch will, in turn, activate a remote indicator, such as an LED, to notify the operator of the condition.

Figure 3:
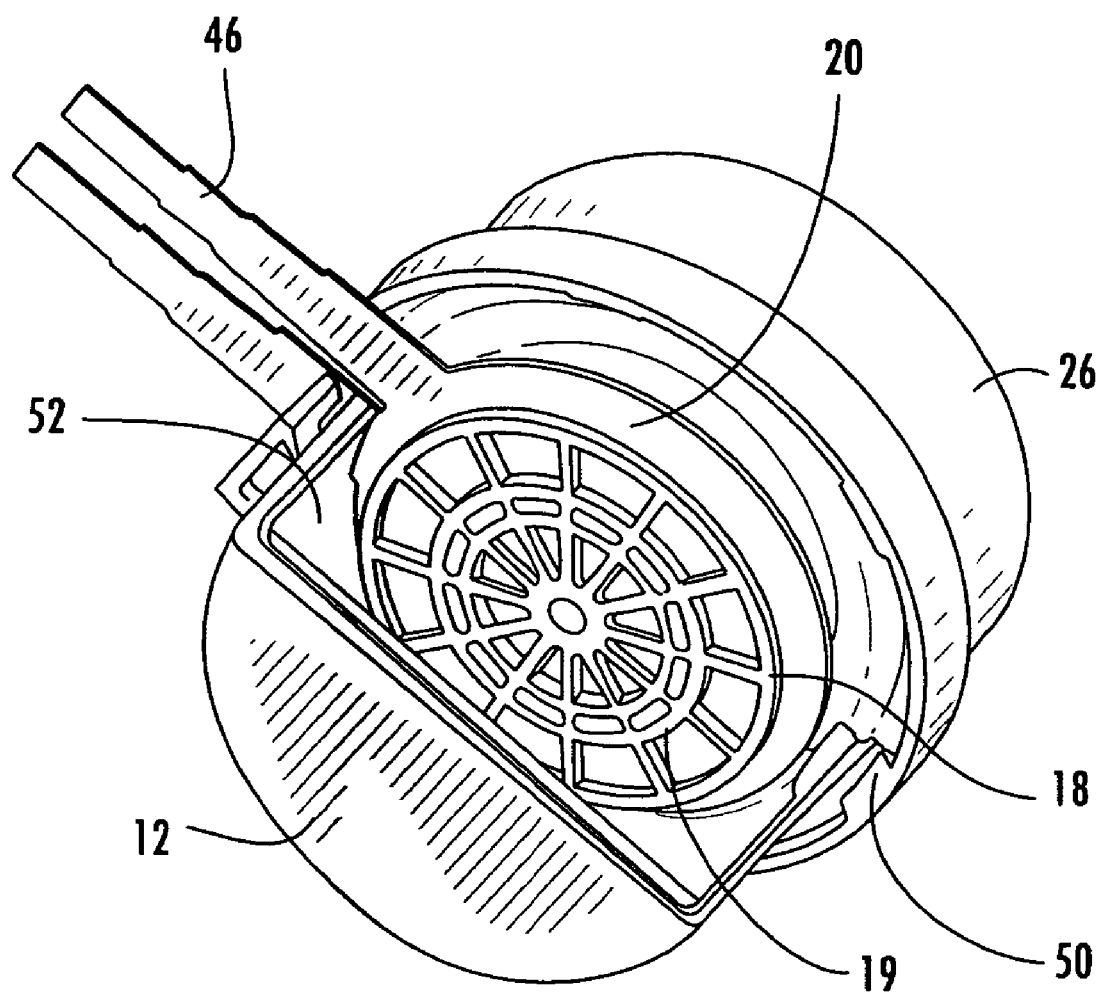
FIG. 3 is cut-away bottom view of the sensor assembly of FIG. 1.
Figure 4:
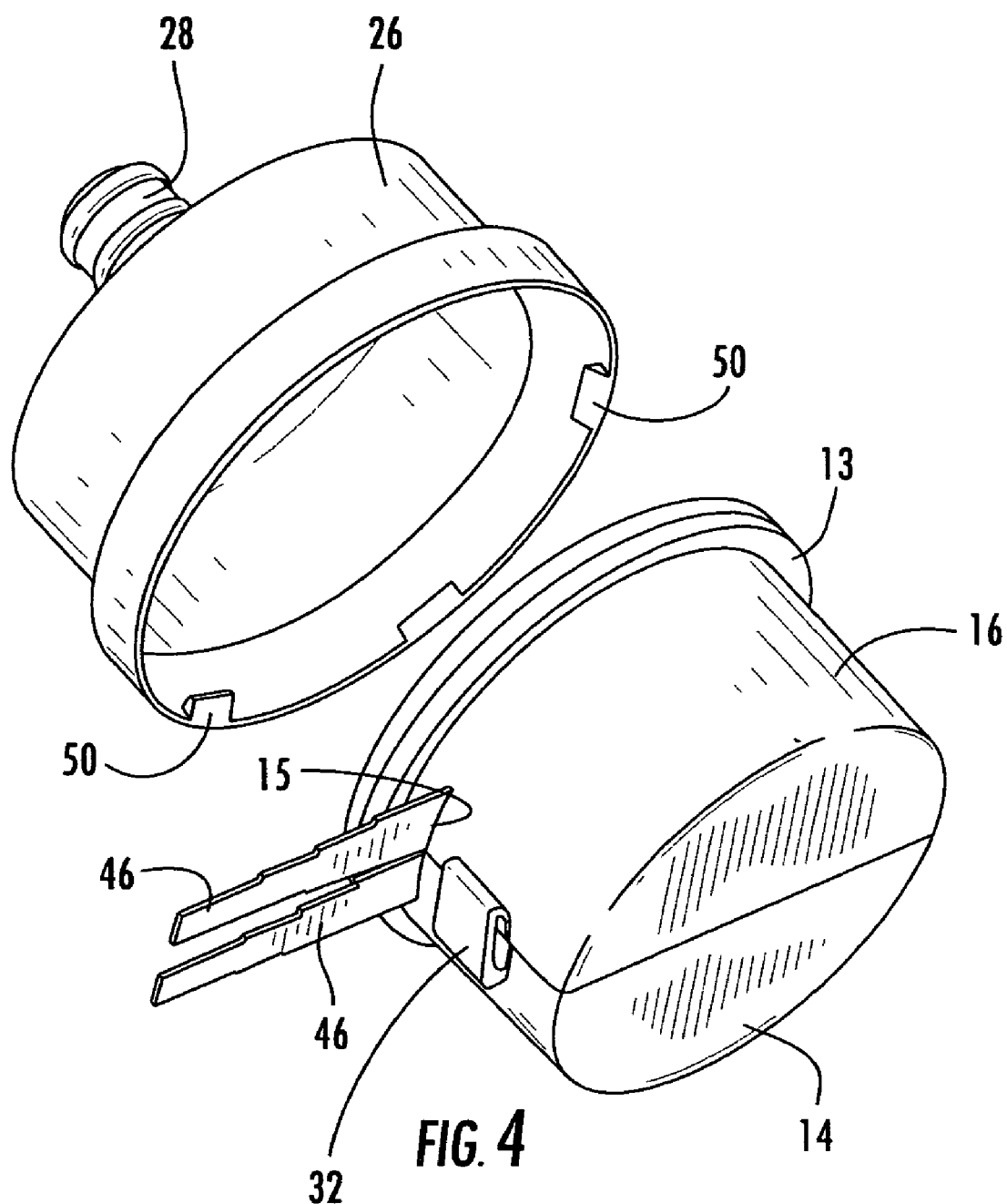
FIG. 4 is an exploded view of the sensor assembly of FIG. 1.

Referring to FIGS. 2–4, the housing 26 forms part of the chamber 54 and defines the nozzle end 28. The nozzle end 28 further defines a passageway 29 that permits air to pass in and out of the chamber 54. In one exemplary application, the nozzle end 28 is connected to the air intake line between the air filter and the carburetor of a small gas engine. As stated above, as air is restricted in the air intake line, the vacuum will be increased in the chamber 54 due to its connection to the intake line via the nozzle end 28.

The housing 26 also defines a plurality of spaced apart hinges 50 that are configured to snap onto the rim 13 formed in the top housing 12. The number and spacing of hinges 50 may vary. It should be understood, however, that other suitable structures can be used to join the housing 26 with the top housing 12.

The plunger disc 24 provides the connection point between the plunger 18 and the diaphragm 22. The plunger disc 24 defines in one aspect, a web-shaped body 25 that, similar to the web-shaped body 19 of the plunger 18, will reduce the mass of this part. The plunger disc 24 defines the opening 27 (FIG. 1) that receives the hinge fingers 36. The hinge fingers 36 secure the plunger disc 24 to the plunger 18. Alternatively, the plunger 18 could connect directly to the diaphragm 22. While the preferred connection is through the use of the plunger disc 24, both connections are contemplated with the invention.

During operation, the vacuum created in the chamber 54 from the air restriction in the air intake line pulls the diaphragm 22 towards the nozzle end 28. The diaphragm 22 acts on the plunger disc 24 which is secured over the diaphragm, and moves the plunger disc 24 as well as the connected plunger 18 toward the nozzle end 28. This movement, in turn, causes the connected elastomer member 30 to come in contact with the switch 20 and thus activate the switch. As indicated earlier, the switch 20 may then activate a remote indicator, such as an LED, to notify the operator of the air restriction condition.

Figure 5:
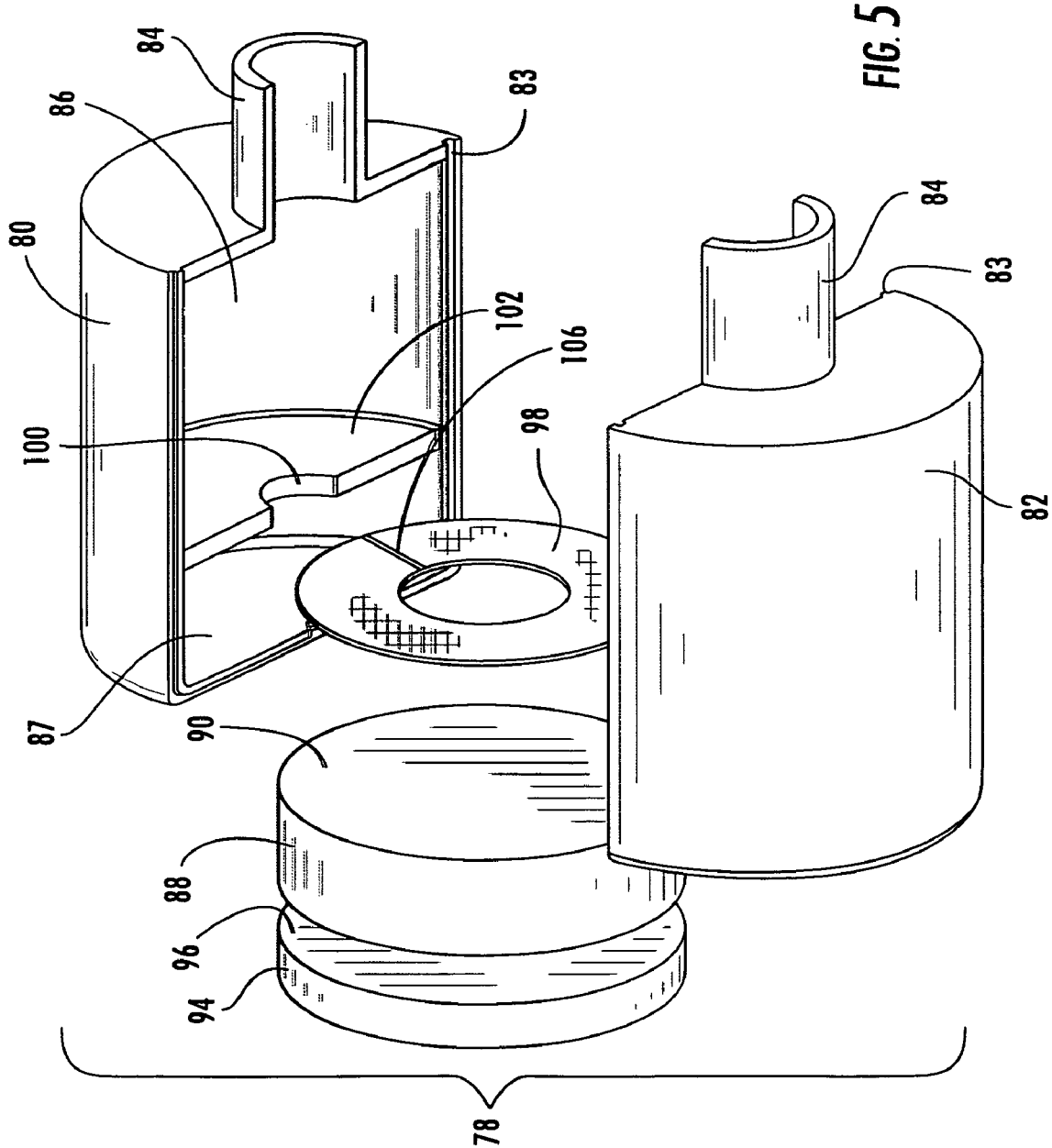
FIG. 5 is an exploded view of an alternative embodiment of an air filter restriction sensor assembly.
Figure 6:
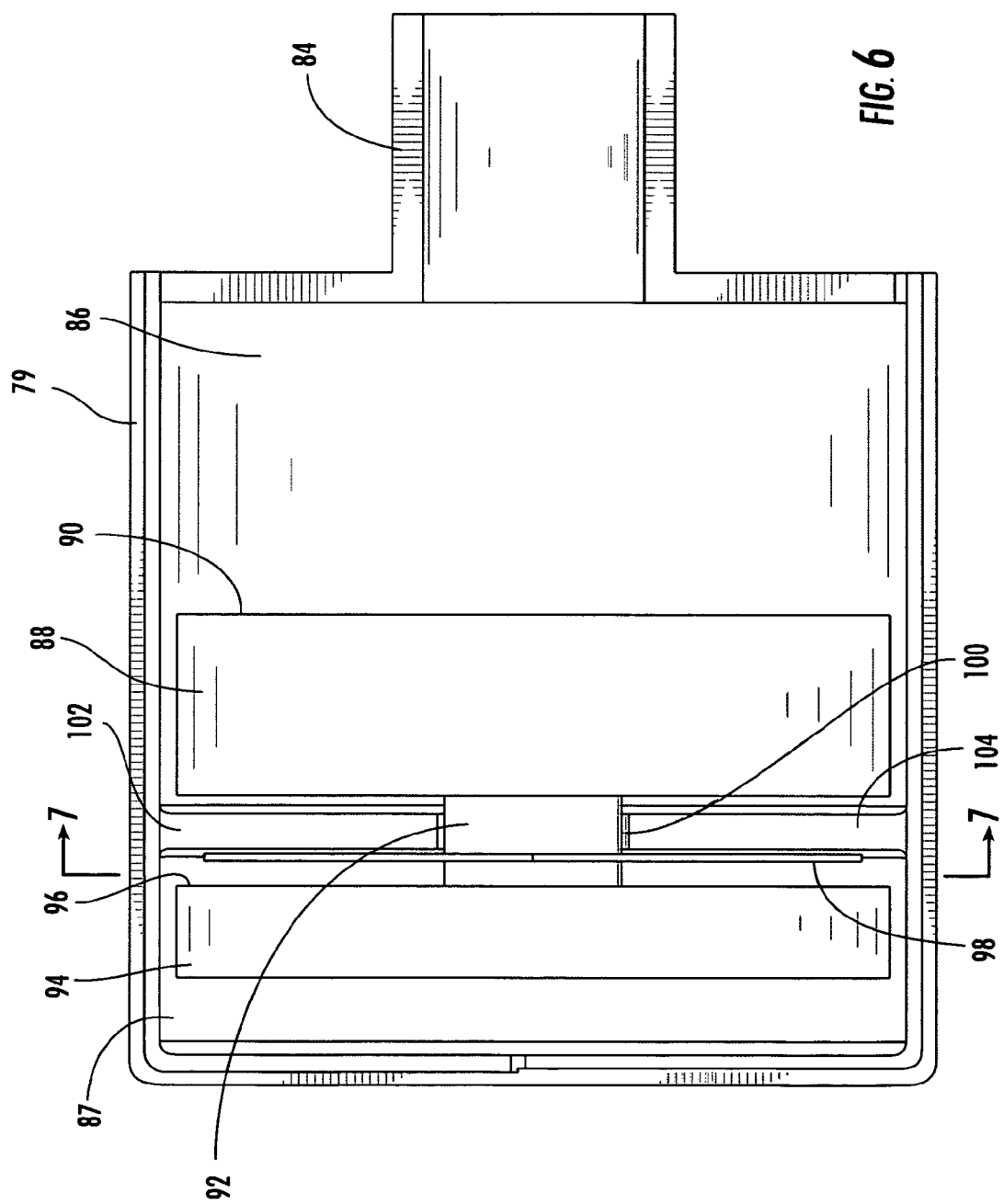
FIG. 6 is a cut-away side view of the sensor assembly of FIG. 5.
Figure 7:
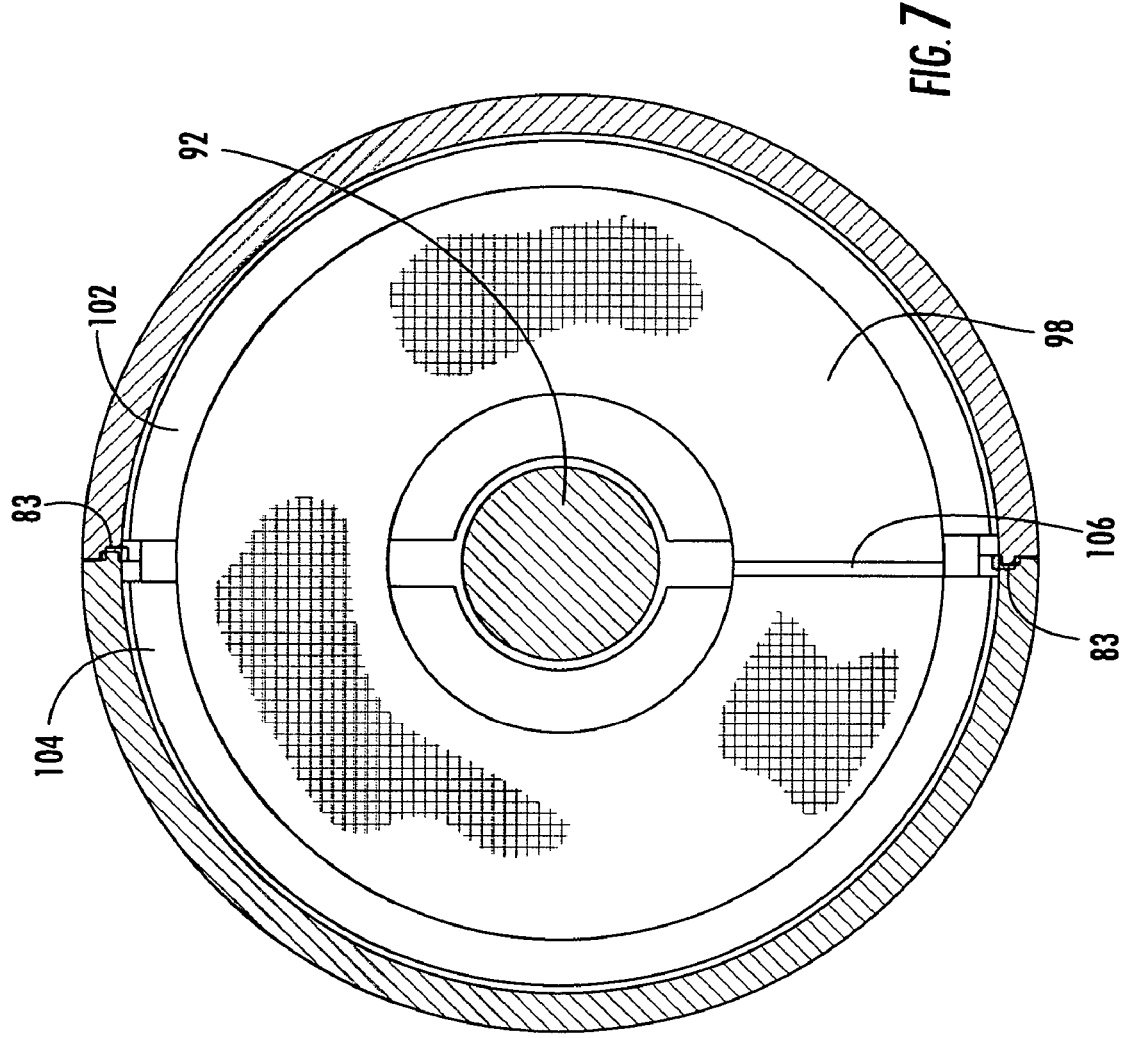
FIG. 7 is a cross-section view of the sensor assembly of FIG. 5 taken at line 7—7.

Referring to FIGS. 5–7, in another exemplary embodiment, an air filter restriction sensor assembly 78 includes a housing 79 (FIG. 6) that includes two housing halves—a first housing half 80 that is aligned with a second housing half 82. To assemble the sensor assembly, the internal components of the sensor assembly are positioned in the first housing half 80, and the second housing half 82 is then aligned with and placed over the first housing half 80. Each housing half defines a tongue and groove connection 83 that is used to join the two housing halves. The first and second housing halves are then ultrasonically welded together along the tongue and groove 83 to create a hermetic seal. The hermetic seal will pemit a vacuum to form inside chambers 86 and 87.

Similar to the above embodiment, the assembled housing 79 defines a nozzle end 84 that may be connected to the air intake line. The housing 79 also defines two inside walls 102, 104 that form an opening 100.

Referring to FIGS. 5 and 6, the sensor assembly 78 also includes a plunger or plunger member 88 that defines a flat face 90. The vacuum created in the chamber 86 will pull against the flat face 90 of the plunger 88. The plunger 88 also defines a shaft 92 that is joined to a contact pad or surface 94. The contact pad or surface 94 defines a face 96 that in operation will contact a switch 98, such as a membrane switch, and activate the switch 98. The shaft 92 of the plunger 88 is configured to extend through the hole 100 formed by the two inside walls 102, 104 in the housing to keep the face 90 and contact pad 94 of the plunger 88 concentric to the housing 79. In this configuration, the plunger 88 is permitted to move back and forth relative to the housing 79. With this configuration, when the vacuum in the chamber 86 (caused by the air restriction) pulls on the face 90, the vacuum will also pull the plunger 88 until the contact pad 94 contacts the switch 98 and activates the switch. Similar to the above embodiment, the switch may electrically connect to other components, such an LED or other remote indicator. In an exemplary application, the switch may be electrically connected in series between the battery on a lawn tractor, for example, and the LED that will be mounted on the tractor where the operator can see it, for example, on the tractor's dashboard. The LED will light when the switch 98 is closed as a result of the sensor assembly 78 detecting the air restriction in the air intake line between the air filter and the carburetor, thereby alerting the operator of this condition.

The switch 98 may be mounted to the inside walls 102, 104 on the side opposite the nozzle end 84. In the exemplary embodiment and as illustrated in FIG. 7, the membrane switch 98 will be split at 106 so that the switch 98 may be placed around the shaft 92 of the plunger 88. As indicated, the switch 98 may be connected to other components. The electrical wires to achieve this connection will be fed out through a hole, not shown, in the housing. If required, the hole can be hermetically sealed.

Figure 8:
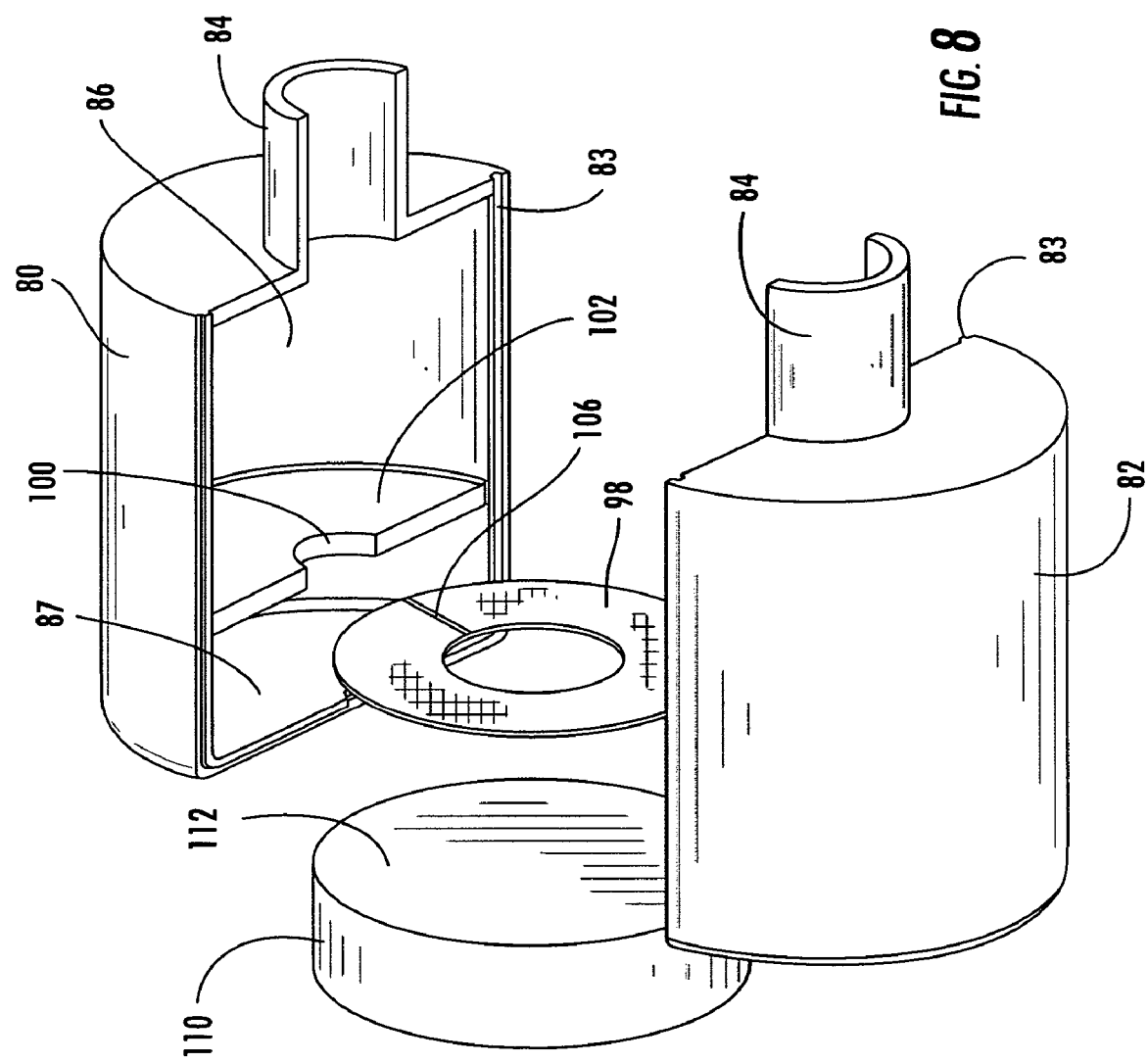
FIG. 8 is an exploded view of another alternative embodiment of an air filter restriction sensor assembly.

Referring to FIG. 8, another exemplary embodiment includes a cylindrical-shaped plunger 110 having a face 112 that will contact the switch 98. With this embodiment, the plunger 110 is positioned in the chamber 87 formed by the housing halves 80 and 82 and the inner walls 102 and 104. The plunger 110 will be positioned adjacent to the switch 98, which will seat on, or adhere to, the inner walls 102 and 104.

Similar to the above embodiment, an opening 100 is formed by the inner walls 102 and 104. The remaining features and aspects of this embodiment are similar to the embodiment described above. With the embodiment depicted in FIG. 8, as a vacuum is created in the chamber 86, the vacuum will pull on the plunger 110 through the opening 100 and the opening in the switch 98, as illustrated in FIG. 8. This pulling force will cause the plunger 110 to either contact or further contact the switch 98 and activate the switch 98.

Referring to FIG. 9, in another exemplary embodiment, an o-ring 108 may be used to seal the chamber 86. The o-ring may be positioned between the plunger 88 and the inner walls of the housing halves 80 and 82. In this embodiment, the chamber 87 is not hermetically sealed. Rather the chamber 87 is open to the atmosphere. Thus, the o-ring 108 may be used to seal the chamber 87 to permit a vacuum to form in the chamber 86. When a vacuum is created in the chamber 86, the plunger 88 will activate the switch in the manner described above.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An air filter restriction sensor assembly comprising:
a housing defining an interior wall, the interior wall further defining a first side, a second side, and an opening, the housing including a nozzle,
a plunger mounted through the opening, the plunger defining a body on which is mounted an elastomer member,
a switch mounted in the housing on the first side of the interior wall wherein the switch is activated when a predetermined force is exerted on the switch from the elastomer member and positioned between the elastomer member and the interior wall, and
a diaphragm mounted to the plunger and on the second side of the interior wall,
whereby upon the creation of a vacuum in the housing, the diaphragm causes the plunger to move the elastomer member into contact with the switch.

2. The air filter restriction sensor assembly as set forth in claim 1, further comprising a disc mounted to the diaphragm and the plunger.

3. The air filter restriction sensor assembly as set forth in claim 2, wherein the housing defines housing halves that are joined together to form at least one chamber.

4. The air filter restriction sensor assembly as set forth in claim 2, wherein the plunger defines a support post and plunger head, the support post mounted through the opening and the plunger head mounted to the diaphragm.

5. The air filter restriction sensor assembly as set forth in claim 2, wherein the switch is a membrane switch.

6. The air filter restriction sensor assembly as set forth in claim 2, wherein the housing is hermetically sealed.

7. The air filter restriction sensor assembly as set forth in claim 2, further comprising an o-ring mounted around the plunger.

8. An air sensor assembly for use with a small gas engine comprising:
   a hermetically sealed housing defining an interior wall that forms a chamber in the housing, the interior wall defining an opening,
   a plunger member mounted through the opening, the plunger member defining a contact surface and a plunger face, the plunger face positioned in the chamber, and
   a switch mounted in the housing and between the contact surface of the plunger and the interior wall wherein the switch is activated when a predetermined force is exerted in the switch from the plunger,
   whereby upon the creation of a vacuum in the first chamber, the plunger will move in the chamber and cause the contact surface to contact the switch.

9. The air sensor assembly as set forth in claim 8, further comprising an o-ring mounted around the plunger.

10. The air sensor assembly as set forth in claim 8, wherein the switch is a membrane switch.

11. The air sensor assembly as set forth in claim 8, wherein the housing defines housing halves that are ultrasonically welded together.

12. The air sensor assembly as set forth in claim 8, wherein the plunger includes a plunger post that joins the contact surface with the plunger face.

13. The air sensor assembly as set forth in claim 12, wherein the switch is mounted to the plunger post, and wherein the switch is coupled to a remote indicator.

14. An air filter restriction sensor assembly for coupling to a remote indicator comprising:
   a housing defining an interior and an interior wall, the interior wall dividing the interior into a first chamber and a second chamber, the housing including a nozzle,
   a plunger mounted in the housing and extending between the first chamber and the second chamber, the plunger including a contact surface,
   a membrane switch mounted in the first chamber wherein the membrane switch is activated when a predetermined force is exerted on the membrane switch from the plunger, the switch being connectable to a remote indicator, and
   a plunger moving member mounted to the plunger and in the second chamber,
   whereby upon the creation of a vacuum in the second chamber, the plunger moving member causes the contact surface to move into contact with the membrane switch.

15. The air filter restriction sensor assembly as set forth in claim 14, wherein the plunger moving member is a diaphragm.

16. The air filter restriction sensor assembly as set forth in claim 15, further comprising a disc mountable to the plunger.

17. The air filter restriction sensor assembly as set forth in claim 16, further comprising an o-ring mounted to the plunger.

18. The air filter restriction sensor assembly as set forth in claim 15, wherein the plunger defines a web-shaped body, and wherein the contact surface is an elastomer member mounted to the web-shaped body.

19. The air filter restriction sensor assembly as set forth in claim 15 wherein the diaphragm defines a crown-shaped periphery.

20. The air filter restriction sensor assembly as set forth in claim 19, wherein the plunger defines a web-shaped body, a post, a plunger head, and hinge fingers, and wherein the diaphragm is mounted to the plunger head and hinge fingers.

* * * * *